March 12, 1935. C. E. PETERSON 1,993,797
POWER UNIT
Filed Jan. 14, 1933 5 Sheets-Sheet 1
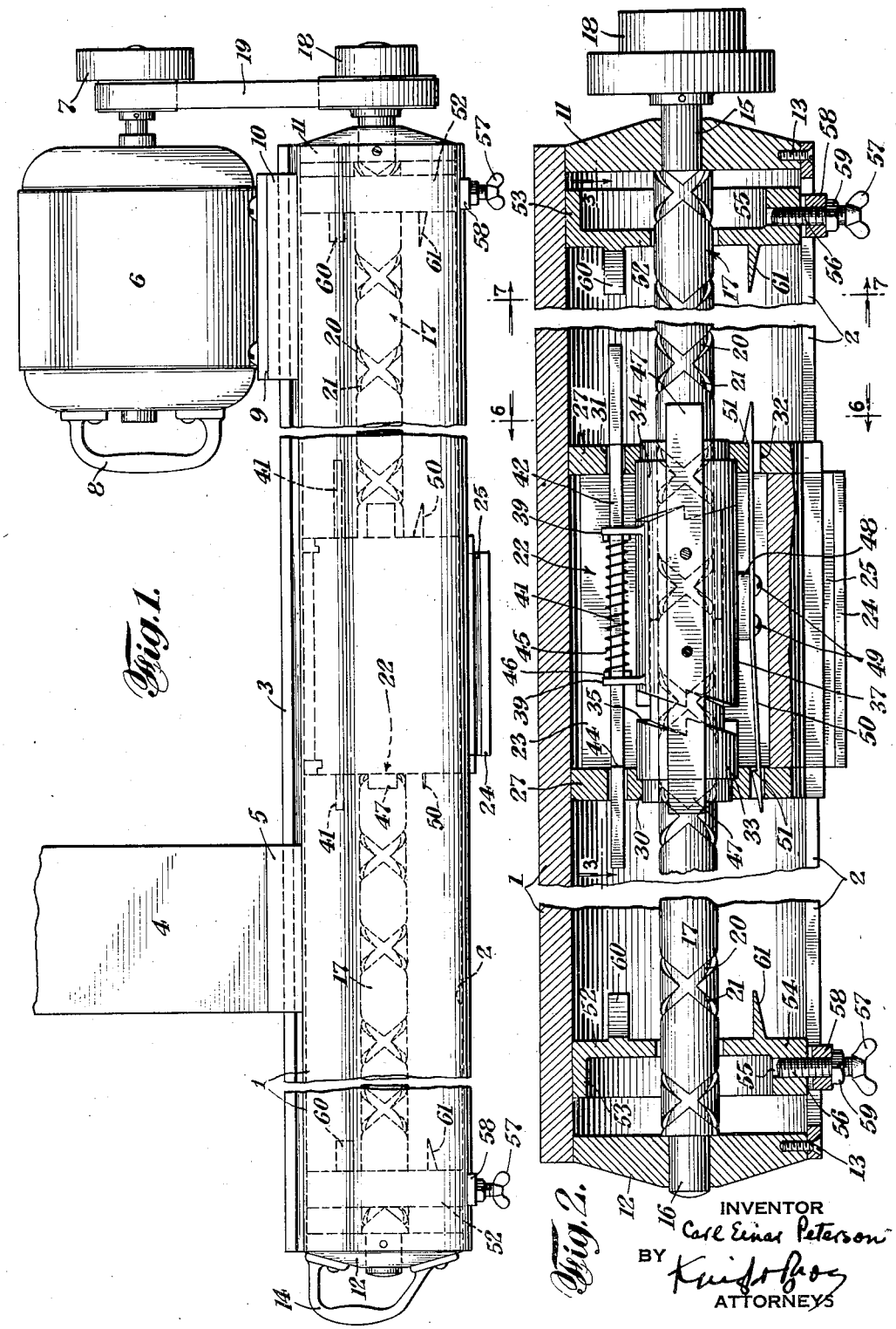

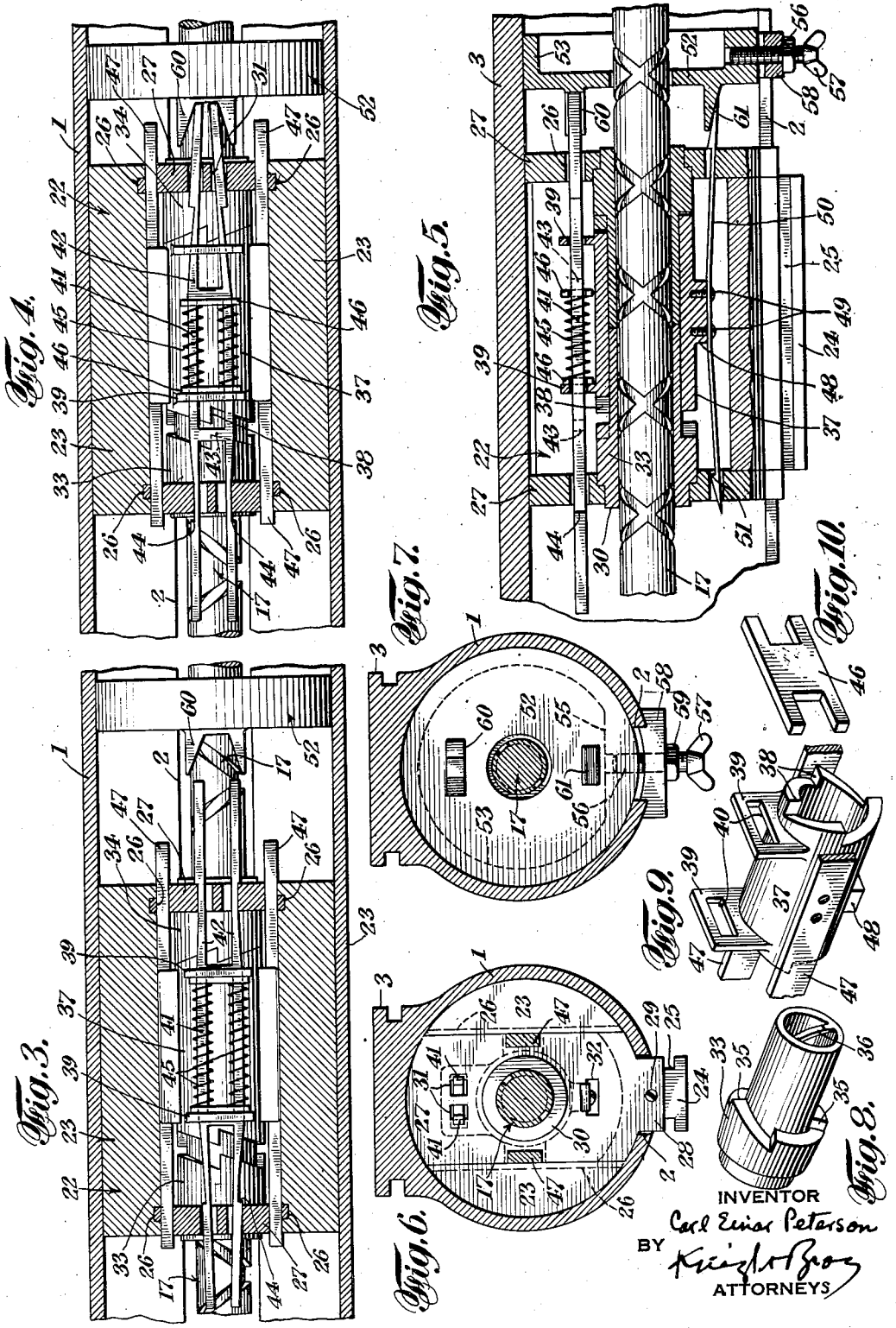

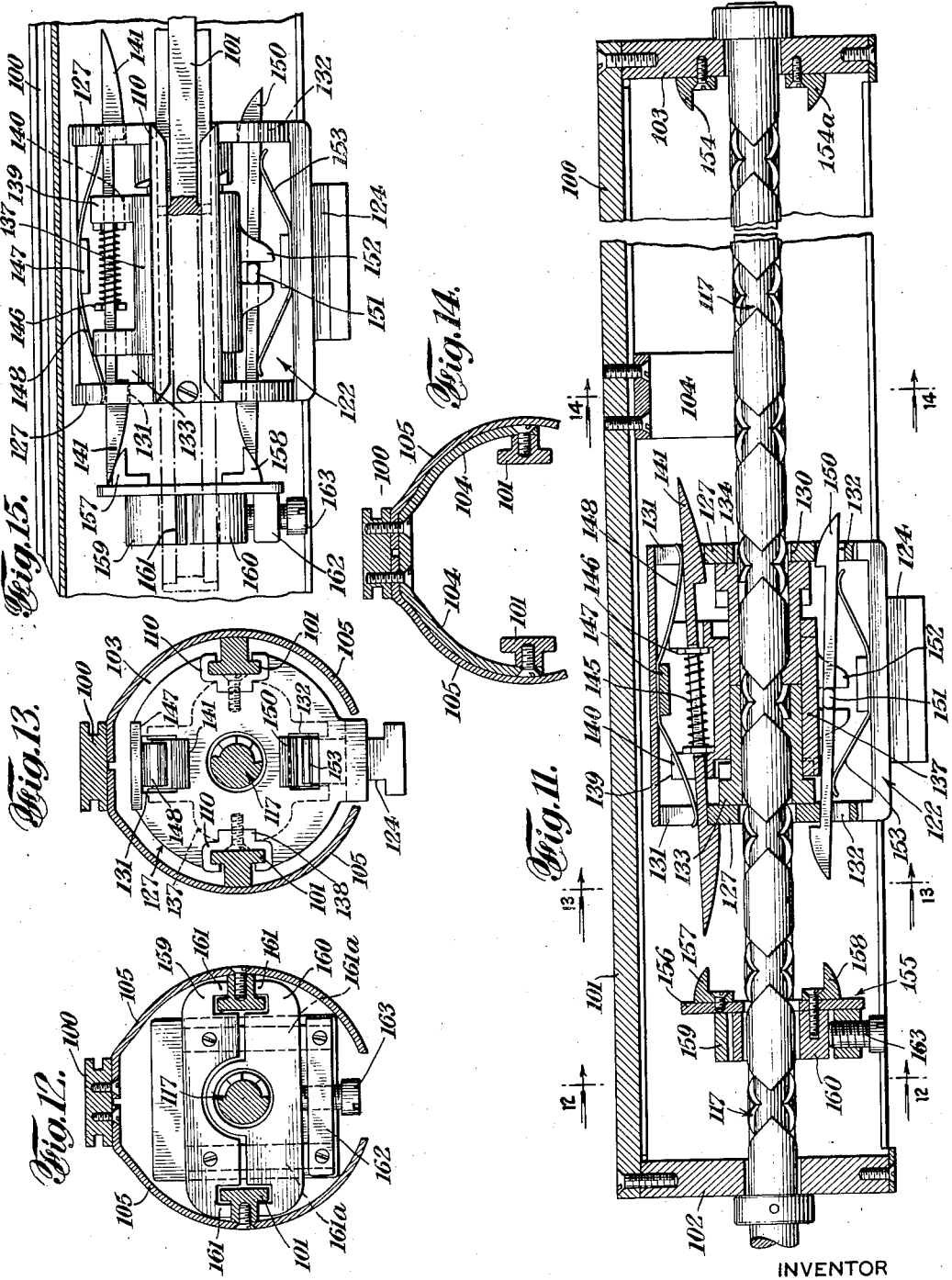

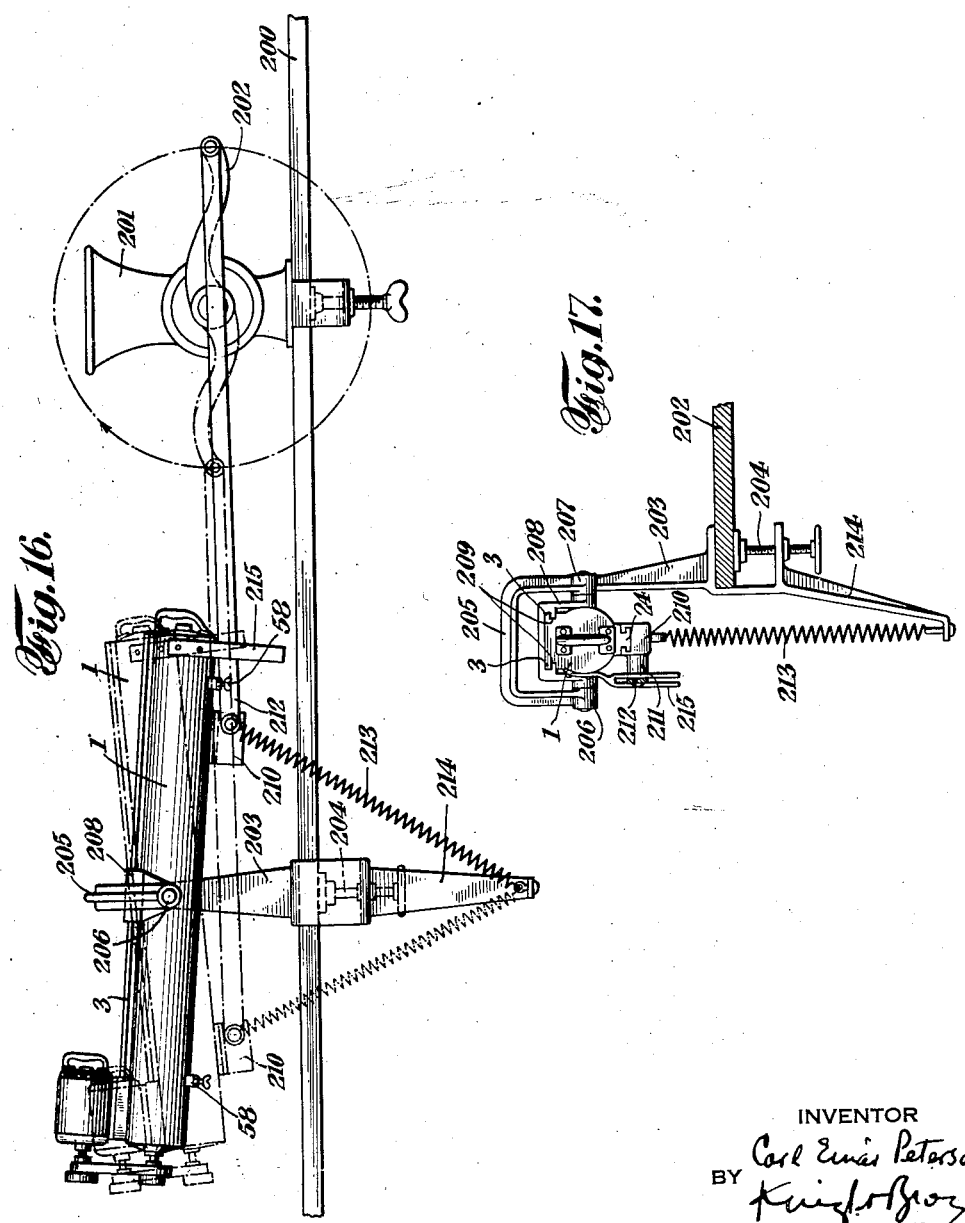

March 12, 1935.  C. E. PETERSON  1,993,797
POWER UNIT
Filed Jan. 14, 1933  5 Sheets-Sheet 5
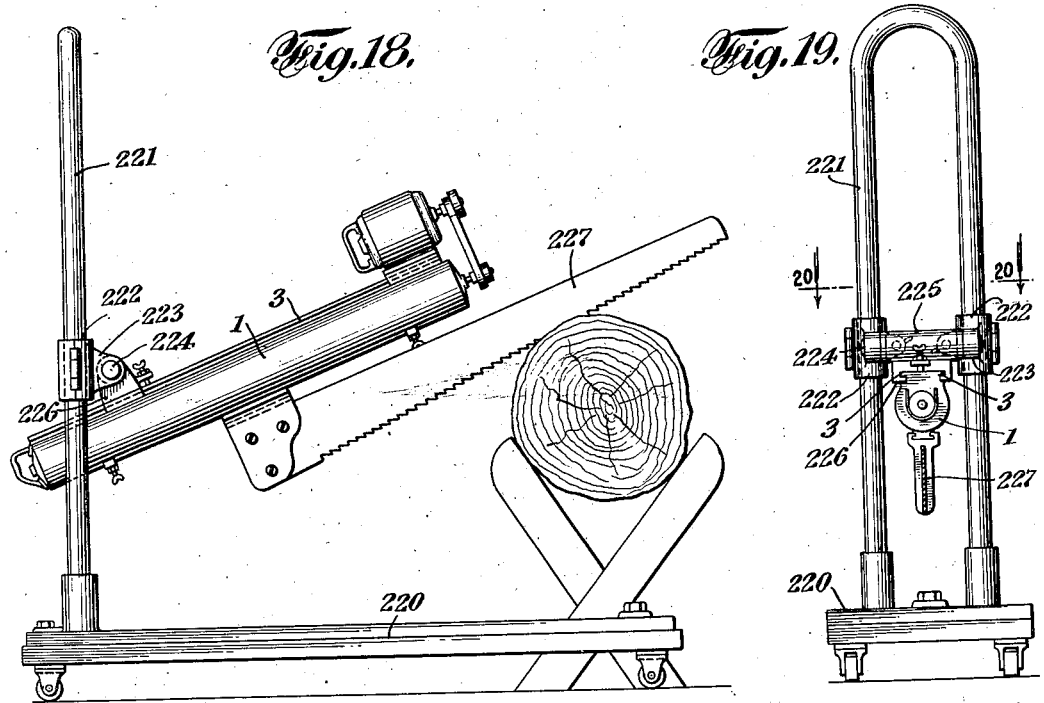
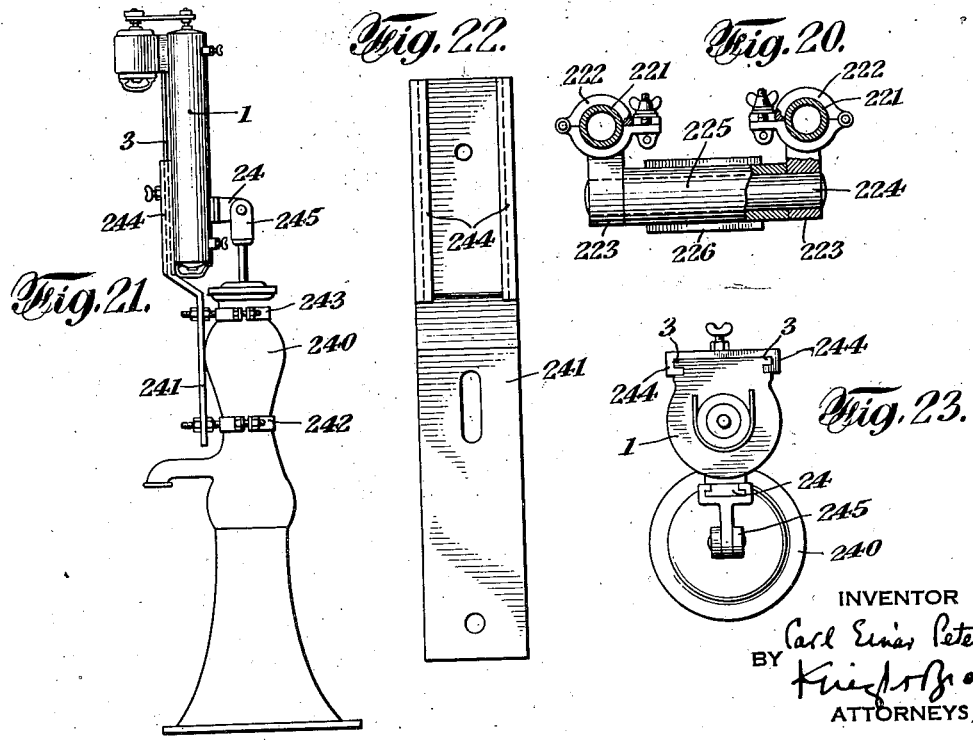

Patented Mar. 12, 1935

1,993,797

UNITED STATES PATENT OFFICE 1,993,797

POWER UNIT

Carl Einar Peterson, Scarsdale, N. Y.

Application January 14, 1933, Serial No. 651,663

4 Claims. (Cl. 74—57)

This invention relates to power units, and has for its object to provide a device which may be attached at will to a variety of tools and other instrumentalities to operate the same.

In general, the invention comprises a frame upon which are mounted: (1) a prime mover, preferably an electric motor; (2) a right-and-left threaded worm driven by the prime mover; (3) a traversing carriage driven by the worm and provided with means for attaching it or operatively connecting it to a tool or other instrumentality; (4) automatic means for reversing the direction of movement of the carriage. In its preferred forms, the unit will be portable and adapted to be held by an operator while in use; or it may be secured to a fixed support, such as a work bench, or to a wheeled track. To facilitate mounting the unit upon a fixed or wheeled support, specially formed attachment means upon the unit will cooperate with correspondingly formed clamps or the like, which may be attached to the support.

The traversing carriage may be directly attached to a tool or to a reciprocating part of a machine; or, by means of a crank connection or its equivalent, the unit may be employed to produce rotary motions.

Various detailed features of construction, contributing to the effectiveness of my improved power unit, will be pointed out in the following specification and claims.

In the drawings, two illustrative embodiments of the unit are shown, together with a few examples, chosen from many, of ways in which the unit may be employed to produce useful motion.

Figure 1 is a side elevation of one embodiment of the invention.

Figure 2 is a longitudinal vertical section of the same embodiment, on a larger scale, the motor and supporting bracket being omitted.

Figure 3 is a fragmentary horizontal section, showing the traversing carriage and a stop member.

Figure 4 is another view like Figure 3, but with the carriage and stop in a different space relation.

Figure 5 is a vertical section of the parts shown in Figures 3 and 4, in the relation shown in Figure 4.

Figure 6 is a cross-section on the line 6—6 of Figure 2.

Figure 7 is a cross-section on the line 7—7 of Figure 2.

Figure 8 is a detail in perspective of a clutch member, on a larger scale.

Figure 9 is a detail in perspective of a clutch sleeve, on the same scale as Figure 8.

Figure 10 is a detail in perspective of a bearing plate for springs, on the same scale as Figures 8 and 9.

Figure 11 is a longitudinal section of another embodiment of the power unit, the motor being omitted.

Figure 12 is a cross-section on the line 12—12 of Figure 11.

Figure 13 is a cross-section on the line 13—13 of Figure 11.

Figure 14 is a cross-section, partly broken off, on the line 14—14 of Figure 11.

Figure 15 is a view showing the carriage in side elevation, parts of the frame being broken off.

Figure 16 is a side elevation of an arrangement for producing rotary motion, as in the meat grinder shown.

Figure 17 is an end elevation of the same device.

Figure 18 is a view in side elevation showing the power unit mounted upon a truck and with a saw attached to the traversing carriage.

Figure 19 is an end elevation of the same.

Figure 20 is a horizontal section on the line 20—20 of Figure 19.

Figure 21 is a view in side elevation showing the unit applied to a pump of conventional design.

Figure 22 is a detail on a larger scale at right angles to Figure 21, of the supporting bracket for the unit.

Figure 23 is a plan view of the arrangement shown in Figure 21, the motor being omitted.

Referring now to the embodiment shown in Figures 1 to 10: 1 is a cylinder, preferably of metal, which serves as a housing for certain of the operating parts, and constitutes the supporting frame of the unit. The cylinder has a longitudinal slot 2 (Figure 6) at the bottom, extending from end to end, and at the top a flange 3, which serves as an attaching means. 4 designates the adjacent portion of any suitable form of supporting bracket, which has a slotted enlargement 5 adapted to slip endwise on to flange 3 and to slide into any desired position along the cylinder. As will appear in connection with the description of specific applications of the device hereinafter, flange 3 and slotted enlargement 5 represent a standardized attachment which permits the unit to be interchangeably mounted in various places and for various purposes.

Similarly attached to cylinder 1 is a motor 6, having a two-speed pulley 7 and a handle 8. Bottom flange 9 of the motor is secured to a slotted attaching plate 10, similar in shape to enlargement 5 and similarly engaged with flange 3.

At each end of cylinder 1 an end plate 11 or 12 is inserted and held in place by radial screws 13 (Figure 2). A handle 14 is carried by end plate 12 and, with handle 8, facilitates transporting the unit or holding it during use.

End plates 11 and 12 are centrally perforated to provide bearings for reduced portions 15, 16 of worm 17. At one end worm 17 carries a two-speed pulley 18, which is connected by belt 19 to motor pulley 7. The worm is provided with right-and-left or oppositely pitched threads 20, 21, the pitch of which will, of course, be chosen in accordance with reference to the requirements of speed and load for the uses intended.

The traversing carriage is generally designated 22. It comprises a body of U-shaped cross-section, open at the top, with segmental side walls 23, 23. Outwardly, the body conforms to the inner wall of cylinder 1, within which it freely slides. Depending from body 22 is an attachment flange 24, which projects through slot 2 and has lateral grooves 25 to receive corresponding flanges on attachment members hereinafter mentioned. The engagement of flange 24 with slot 2 also prevents the carriage from turning in cylinder 1 under the influence of the driving torque. Near each end, segmental walls 23 are grooved at 26 to receive flanged closure plates 27, which may have depending lugs 28 through which screws 29 pass into body 22. Plates 27 have central shouldered apertures 30 through which worm 17 passes; and additional apertures 31 and 32 (Figure 6), whose purpose will be described later.

A pair of oppositely presented traversing nuts 33, 34, (separately shown in Figure 8,) embrace worm 17 between plates 27, 27. At their outer ends, these nuts are shouldered to fit abuttingly in apertures 30 of plates 27, and at their inner ends the nuts abut against each other. Thus the nuts are confined between plates 27, but with sufficient looseness to permit one of them, when idling, to turn relatively to the closure plate and to the other nut. Each nut is provided with one-way clutch teeth 35 on its inner axial surface. Internally, each nut has a spiral spline 36 which conforms to and engages one of the threads upon worm 17, being of a length sufficient to bridge the gaps in the thread where the threads cross. The left-hand nut 33 is shown in Figure 8, and this nut will engage worm-thread 20, being traversed, when held against rotation, to the left or right, depending upon the direction in which the worm is rotated. Similarly, the right-hand nut 34 engages thread 21 and is traversed oppositely to nut 33; it being understood that only one of the nuts is held against rotation at one time, the other then idling.

A shiftable clutch sleeve 37 is telescopically mounted upon the inner reduced portions of nuts 33, 34, and is provided on its axial faces with oppositely presented teeth 38, complementary to teeth 35 on the traversing nuts. The length of sleeve 37 is such that it can be in toothed engagement with only one of the nuts at a time, the other nut then rotating within the sleeve.

Projecting upwardly from the sleeve are spaced lugs 39 having transversely elongated apertures 40. A latch member 41, comprising side bars 42 and cross bars 43, rests loosely in apertures 40 and projects beyond the carriage in both directions through apertures 31 in the closure plates 27. Side bars 42 are of springy material and have lateral notches 44, one pair of which is adapted to engage closure plate 27, when seated therein, and to be released therefrom when the outer ends of the side bars are forced together, as hereinafter described. As shown in Figure 3, the right-hand notches are in latching engagement with the adjacent closure plate, while the left-hand notches are inoperative with respect to their closure plate. In Figure 4 the right-hand notches have been released and forced inwardly, whereas the left-hand notches are in position to engage.

Upon each side bar 42, between the cross bars, there is wound a compression spring 45 and H-shaped bearing plates 46 are inserted between the ends of the springs and cross bars 43. The arms of the bearing plates embrace the side bars 42 and are adapted to slide along the side bars, inwardly from cross bars 43 but not outwardly. Thus, in the position shown in Figure 14, latch 41 having been shifted to the left with respect to sleeve 37, the right-hand bearing plate 46 has been lifted from right-hand lug 39, compressing springs 45 against the left-hand bearing plate and lug.

Integral with or rigidly secured to sleeve 37 on each side are bars 47 which project through apertures in closure slides 27. These bars prevent the sleeve 37 from turning in the carriage; they also serve as emergency or safety shift members in case the normal shifting mechanism should fail to function.

On the under side of sleeve 37 is a protuberance 48 to which is secured, as by screws 49, a spring latch 50. The latch projects through apertures 32 in slides 27 and is notched at 51, 51, whereby the latch may engage alternately with slides 27 as sleeve 37 shifts back and forth.

Cooperating with the latch members hereinbefore described are stops 52, conforming to the inner wall of cylinder 1, and provided with axial flanges 53 to increase the area of contact. The flange is thickened at 54 and has a radial threaded bore 55 which receives stem 56 of wing nut 57. An arcuate clamp 58 bridges slot 2 of cylinder 1, and a lock nut 59 is also provided. Stops 52 may be shifted to any desired positions along cylinder 1, and secured in place by means of clamps 52. The purpose of this arrangement will be described later. On the inner faces of stops 52 are double cams 60, coacting with latch 41 and cams 61, coacting with latch 50.

The operation of the embodiment described above is as follows: The motor being started, worm 17 will rotate continuously in one direction until the motor is stopped. In the position shown in Figures 2 and 3, sleeve 37 engages nut 34 and holds it against rotation, the sleeve being held against rotation in the carriage by bars 47 and the carriage being held against rotation in cylinder 1 by attachment flange 24 projecting through slot 2. Nut 34 is engaged with thread 21 on the worm, and the worm is assumed to be rotating in the direction which will drive nut 34 and the carriage to the right, nut 33 in the meantime being idle although rotating with the worm.

As the carriage approaches right-hand stop 52 (Figure 4), the ends of side bars 52 will impinge upon cam 60 and will be forced together, releasing the side bars from their latched engagement with closure plate 27. The movement of the carriage will continue in the same direction, since latch 50 still holds sleeve 37 in engagement with nut 34. As the movement of the carriage continues, latch 41 abuts against stop 52 and springs 45 are compressed until latch 50 reaches cam 61, which releases this latch, and sleeve 37 is shifted to the left by the accumulated pressure of springs 45. This throws the sleeve into engagement with nut 33 and the carriage begins to travel in the opposite direction. The shifting of sleeve 37 to the left has now engaged the latches 41 and 50 with the left-hand closure plate 27. Bars 47, aside from their previously mentioned function of preventing the sleeve from turning, serve as a safety means to positively shift the sleeve out of engagement with the traversing nut and prevent the device from jamming, in the event that springs 45 fail to throw the sleeve over.

It will be seen that the carriage is caused to reciprocate, carrying with it the attachment flange 24, to which may be secured a tool or other instrumentality, examples of which will be given hereinafter. By adjusting either or both of the stops 52 along the frame, any desired length of movement may be obtained, and this movement may be centered at any desired position along the frame.

Referring now to Figures 11 to 15, in which a modified form of the power unit is shown, the frame in this instance comprises a top rail 100 and side rails 101, which are held in spaced relation by end plates 102, 103. At intervals, the structure may be strengthened by straps 104 of rigid material, and cover plates 105 may be added to protect the working parts.

The carriage 122 is a U-shaped frame having circular end walls 127 and terminating at the bottom in a preferably integral attachment flange 124. The end walls have central apertures 130 through which worm 117 passes and additional apertures 131 and 132 to receive the latch members hereinafter referred to. Laterally, the end walls have recesses in which are seated channeled rail-engaging members 110, by means of which the carriage is supported upon and guided along the rails in its movement. Traversing nuts 133, 134 do not differ materially from those previously described. Clutch sleeve 137 has lateral longitudinal channels 138 which engage and are guided by channeled members 110. As in the former embodiment, lugs 139 rise from the top of sleeve 137, but in this instance the lugs are provided with open notches 140 in which seats latch 141 with its springs 145 and spring bearing plates 146. A strip 147 across the top of the carriage provides anchorage for leaf spring 148, which bears down upon latch 141.

Beneath sleeve 137 is a shorter latch 150 which has ears 151 pivotally confined between trunnion lugs 152 on the sleeve. Spring 153, secured to the carriage, bears upwardly against latch 150.

The cams 154, 154a, which coact with the latches 141 and 150, respectively, at the right end of the movement, are shown attached to the end plate 103. This is a permissible simplification provided an adjustable stop be provided at the other end of the movement. Such a stop 155 is shown in Figures 11 and 12. A plate 156 carries cams 157 and 158. Upper and lower clamp members, 159, 160, have hooked portions 161 which embrace the rails 101 and are adapted to be clamped against them. The upper clamp 159 has two bars 161a projecting downwardly through bores in lower clamp 160. A bridge member 162 joins the lower ends of the bars and has a threaded aperture through which screw 163 passes to bear against clamp 160. When the screw is tightened upper clamp 159 is drawn downwardly, and lower clamp 160 is forced upwardly, clamping the rails and holding the stop in place.

The operation of this embodiment does not differ materially from that previously described. Latch 141 is longer than latch 150, and is released first at the end of the movement of the carriage. As the movement continues, spring 145 is compressed until latch 150 is released, whereupon the clutch sleeve is thrown over into engagement with the other traversing nut.

The power unit may be employed in various ways, of which a few examples will be given.

In Figures 16 and 17 is shown an arrangement for producing rotary motion, as in driving a meat grinder, for example. Upon a support 200, such as a kitchen table, a meat grinder 201 of conventional form is clamped in the usual manner. The grinder is provided with a crank arm 202, from which the usual hand grip has been removed. To the same support is affixed a bracket 203 by means of a clamping device 204. The bracket has an overhanging arm 205, the end 206 of which is apertured. Aligned with the aperture mentioned is another aperture at the point 207, these apertures constituting bearings for the pintles of a yoke 208, which has horizontal ledges 209 forming channels adapted to receive the flanges 3 on cylinder 1 of the power unit. The unit is thus supported upon a horizontal axis permitting it to rock. The attachment flange 24 of the traversing carriage (previously described) carries a channeled block 210 from which projects a stud 211. The stud provides means for pivotally attaching one end of a drive bar 212, the other end of which is pivotally secured to crank arm 202 of the grinder. A tension spring 213 is secured at one end to block 210 and at the other end to depending arm 214 of bracket 203. A fork 215, secured to cylinder 1, straddles drive bar 212 and prevents it from buckling while pushing.

The operation is as follows: The cam stops previously described, and represented in Figure 16 by clamps 58, must be carefully adjusted so as to stop and reverse the carriage at points corresponding to the extreme right and left positions of crank arm 202. As shown, the carriage and crank arm have reached their extreme right positions, and it is assumed that the clutch within the unit has shifted so as to cause the carriage to move to the left. In this position the right end of cylinder 1 is held down, as shown in full lines, so that the point of attachment of bar 212 to stud 211 is below the dead center line of crank arm 202. As the carriage moves leftward, bar 212 will pull crank arm 202 downwardly and leftwardly, thus rotating the grinder. When spring 213 has passed through its central vertical position it will exert its pull upon the cylinder to the left of its pivotal axis and thus rock the left end of the cylinder downwardly, as shown in dotted lines. Stud 211 will again be brought below the dead center, disposing bar 212 at an angle permitting it to push the crank arm to the right.

In Figures 18 to 20, the unit is shown mounted on a wheeled truck 220. A U-form standard 221 has on each leg a sliding collar 222 which may be fixed at any desired elevation. Ears 223, projecting from collars 222, are apertured to receive a pin 224 upon which is pivotally mounted the sleeve portion 225 of a channeled yoke 226. As will be understood from previous descriptions, yoke 226 is adapted to receive and carry the power unit by engagement with the attaching flange 3. The travelling carriage in the example shown is attached to a saw 227.

In Figures 21 to 23, the unit is shown applied to a pump 240 of usual design. A bracket 241, secured to the pump by means of clamps 242, 243, has its upper end channeled at 244 to receive flange 3 of cylinder 1. The handle of the pump is removed and the plunger 245 connected directly to attachment flange 24 of the power unit.

Many other applications of the device may be readily conceived, with respect to both the tools and instrumentalities to be operated, and to the mountings of the unit.

I claim:

1. A power unit comprising in combination a frame, a right-and-left worm mounted for rotation in the frame, means for driving the worm, traversing nuts engaging the right and left threads of the worm, respectively, a reciprocable carriage guided by the frame and traversable by each of said nuts, a clutch sleeve mounted upon said worm between said nuts and shiftable into engagement with either of said nuts to hold the latter against rotation, and stops on each side of said carriage in the path of said clutch sleeve for arresting the movement of said sleeve to shift it from the engaged nut to the other nut.

2. A power unit comprising in combination a frame, a right-and-left worm mounted for rotation in the frame, means for driving the worm, traversing nuts engaging the right and left threads of the worm, respectively, a reciprocable carriage guided by the frame and traversable by each of said nuts, a clutch sleeve mounted upon said worm between said nuts and shiftable into engagement with either of said nuts to hold the latter against rotation, a shifter bar reciprocably mounted upon said sleeve and projecting beyond said carriage on each side thereof, means yieldably opposing longitudinal movement of said bar in either direction, stops on each side of said carriage in the path of said bar, a latch positively preventing the clutch sleeve from shifting, and means releasing said latch after the movement of said shifter bar has been arrested by the respective stop.

3. A power unit according to claim 2 in which the latch has oppositely presented notches which respectively, according to the direction of travel, engage corresponding elements of the carriage, and the latch releasing means comprises a stop on each side of the carriage in the path of the latch.

4. A power unit according to claim 2 in which the clutch sleeve is provided with longitudinally spaced lugs which guidingly engage the shifter bar, and a compression spring is confined between spaced stop members carried by said shifter bar, said stop members being disposed inwardly with respect to said lugs and being shiftable inwardly, but not outwardly, relative to said shifter bar.

CARL EINAR PETERSON.